(12) United States Patent
Wickeraad et al.

(10) Patent No.: US 10,887,232 B2
(45) Date of Patent: Jan. 5, 2021

(54) DYNAMIC ALLOCATION OF HASH TABLE RESOURCES

(71) Applicant: Hewlett Packard Enterprise Development LP, Houston, TX (US)

(72) Inventors: John A. Wickeraad, Granite Bay, CA (US); Mark Gooch, Roseville, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 25 days.

(21) Appl. No.: 16/062,652

(22) PCT Filed: Dec. 16, 2015

(86) PCT No.: PCT/US2015/065942
§ 371 (c)(1),
(2) Date: Jun. 15, 2018

(87) PCT Pub. No.: WO2017/105417
PCT Pub. Date: Jun. 22, 2017

(65) Prior Publication Data
US 2018/0375772 A1   Dec. 27, 2018

(51) Int. Cl.
*H04L 12/743* (2013.01)
*H04L 12/701* (2013.01)
(Continued)

(52) U.S. Cl.
CPC ...... *H04L 45/7453* (2013.01); *G06F 16/9014* (2019.01); *G06F 16/9017* (2019.01);
(Continued)

(58) Field of Classification Search
CPC .. G06F 9/3851; G06F 9/3885; G06F 16/9014; G06F 16/9017; H04L 47/80; H04L 45/00
See application file for complete search history.

(56) References Cited

U.S. PATENT DOCUMENTS 5,450,595 A    9/1995  Chen et al.
6,212,184 B1 * 4/2001  Venkatachary ......... H04L 45/00
                                              370/238
(Continued)

FOREIGN PATENT DOCUMENTS

WO    WO-2010/120457 A2    10/2010

OTHER PUBLICATIONS

Pagh et al., "Cuckoo hashing", Journal of Algorithms, vol. 51, No. 2, May 1, 2004, pp. 122-144.
(Continued)

*Primary Examiner* — Asad M Nawaz
*Assistant Examiner* — Syed Ali
(74) *Attorney, Agent, or Firm* — Hewlett Packard Enterprise Patent Department

(57) ABSTRACT

Examples relate to dynamic allocation of hash table resources. In one example, a computing device may: receive, from a particular lookup function of a plurality of lookup functions, a lookup request; identify, based on the particular lookup function, a logical hash table that corresponds to the particular lookup function, the logical hash table mapping to at least one physical hash table resource; obtain, from one of the at least one physical hash table resource, response data that is responsive to the lookup request; and provide the response data to the particular lookup function.

18 Claims, 4 Drawing Sheets

(51) Int. Cl.
  *G06F 16/901* (2019.01)
  *H04L 12/927* (2013.01)
  *H04L 12/715* (2013.01)
  *H04L 12/741* (2013.01)
  *H04L 12/911* (2013.01)

(52) U.S. Cl.
  CPC .............. *H04L 45/00* (2013.01); *H04L 47/80* (2013.01); *H04L 45/64* (2013.01); *H04L 45/74* (2013.01); *H04L 47/782* (2013.01)

(56) References Cited

U.S. PATENT DOCUMENTS

| | | | |
|---|---|---|---|
| 6,272,503 B1* | 8/2001 | Bridge, Jr. | G06F 16/9017 |
| 6,360,220 B1* | 3/2002 | Forin | G06F 16/9014 |
| 6,535,867 B1* | 3/2003 | Waters | G06F 16/10 |
| 6,578,131 B1 | 6/2003 | Larson et al. | |
| 7,058,639 B1 | 6/2006 | Chatterjee et al. | |
| 7,085,911 B2 | 8/2006 | Sachedina et al. | |
| 7,466,703 B1* | 12/2008 | Arunachalam | H04L 45/00 370/351 |
| 7,650,429 B2 | 1/2010 | Panigrahy et al. | |
| 8,478,799 B2* | 7/2013 | Beaverson | G06F 16/128 707/823 |
| 8,706,736 B2 | 4/2014 | Smith et al. | |
| 8,938,469 B1* | 1/2015 | Keen | H04L 45/7453 707/747 |
| 9,020,953 B1 | 4/2015 | Zilmer et al. | |
| 2003/0065812 A1* | 4/2003 | Beier | H04L 67/2842 709/236 |
| 2008/0021908 A1* | 1/2008 | Trask | G06F 16/9014 |
| 2010/0284405 A1 | 11/2010 | Lim | |
| 2010/0332846 A1* | 12/2010 | Bowden | G06F 16/9017 713/189 |
| 2011/0225168 A1* | 9/2011 | Burroughs | G06F 16/3851 707/747 |
| 2012/0254140 A1* | 10/2012 | Srinivasaraghavan | G06F 16/1844 707/705 |
| 2013/0185378 A1 | 7/2013 | Giacomoni et al. | |
| 2015/0058595 A1 | 2/2015 | Gura et al. | |
| 2015/0169467 A1* | 6/2015 | Chase | G06F 16/9014 711/216 |

OTHER PUBLICATIONS

International Search Report and Written Opinion received for PCT Patent Application No. PCT/US2015/065942, dated Sep. 12, 2016, 10 pages.

European Search Report and Search Opinion Received for EP Application No. 15910895.0, dated Apr. 11, 2019, 10 pages.

Zsolt Istvan, et al, A Flexible Hash Table Design For 10GBPS Key-Value Stores On FPGAS, Jun. 24, 2013, 8 Pgs.

* cited by examiner

DYNAMIC ALLOCATION OF HASH TABLE RESOURCES

BACKGROUND

Computer networks often include a variety of different types of devices for processing network traffic. Servers, routers, switches, and load-balancers, for example, are devices that may operate within a computer network to forward traffic from one computing device to another. In some situations, network devices may be used to determine the manner in which network traffic is forwarded, such as the path a network packet takes, the network packet's Quality of Service (QoS), and/or any access controls associated with the network packet source or destination.

BRIEF DESCRIPTION OF THE DRAWINGS

The following detailed description references the drawings, wherein.

DETAILED DESCRIPTION

Figure 1:
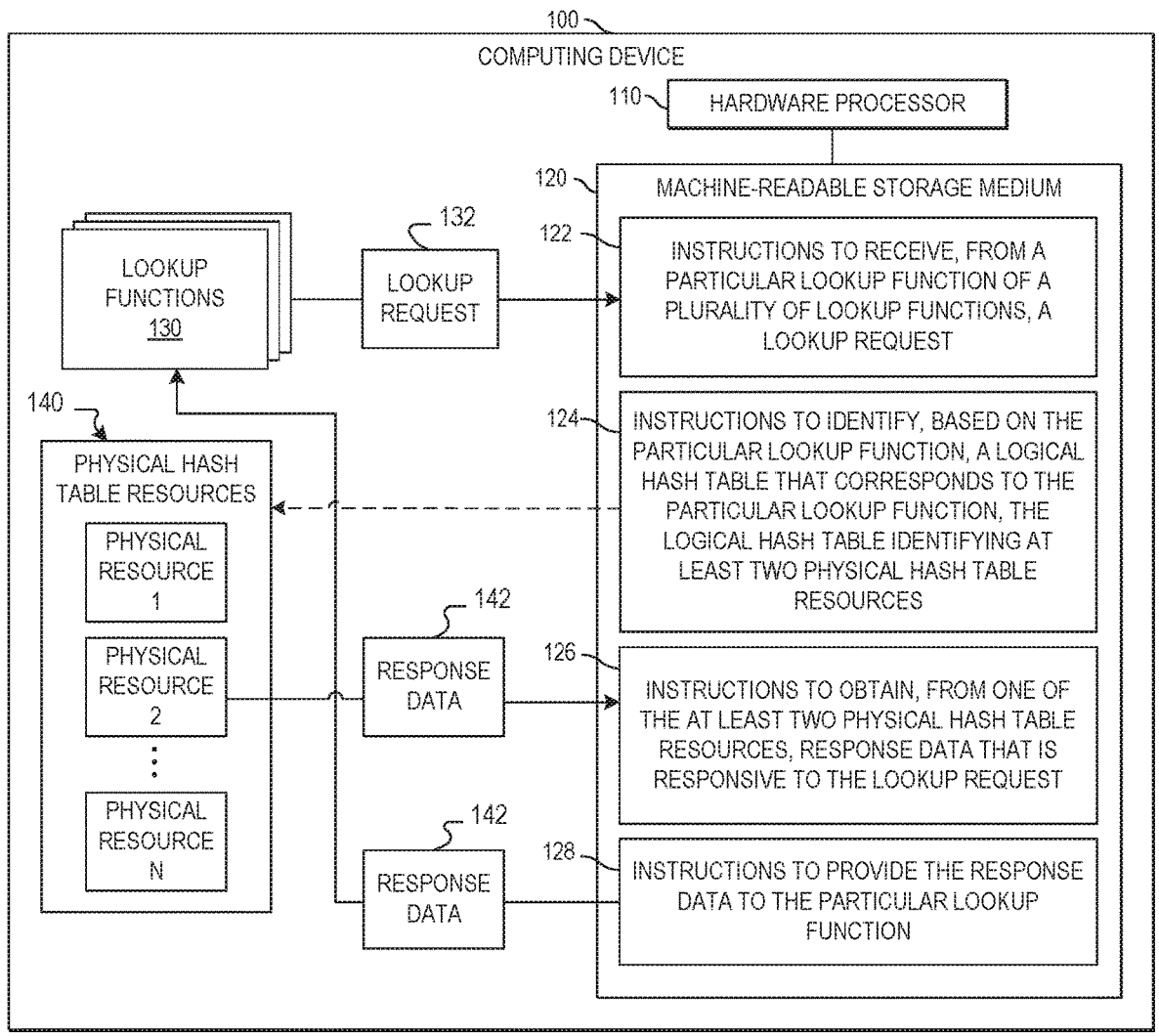
FIG. 1 is a block diagram of an example computing device for using dynamically allocated hash table resources.

Computing devices may store a variety of data using hash tables, which are data structures used to map keys to values stored in a data storage device. A key may be provided to a hash function that generates an address, or bucket, based on the key, and a value may be stored at the generated address. Lookup functions are used to obtain data from hash tables in a similar manner, e.g., a key is provided to a hash function that generates the address at which the value is stored. A computing device may implement multiple hash tables for storing a variety of data accessible by a variety of lookup functions. The amount of physical storage resources used by lookup functions may vary for a variety of reasons, and the storage requirements may change over time. Using logical hash tables, a computing device may dynamically allocate physical hash table resources to various lookup functions in a manner designed to efficiently use the physical resources available to the computing device.

For example, an intermediary network device, such as a switch or router, may include a variety of lookup functions to determine how to process network packets that are received by the device. Lookup functions may be used, within a switch or router, to implement or facilitate implementation of features such as bridging, routing, Access Control List (ACL) security, Quality of Service (QoS), and OpenFlow functionality. In situations where hash tables are used to store values for the various lookup functions, the size of the hash tables used for each lookup function may vary depending upon on a variety of things, such as the type of device, the network topology, and user preferences. The ability to dynamically allocate the physical hash table resources of a network device to particular lookup functions may facilitate relatively efficient performance of the network device and provide flexibility to the network device, allowing it to be used in a variety of situations and network configurations.

By way of example, a network switch may include a pool of Random Access Memory (RAM) for hash tables. The individual physical resources within the pool may have a variety of capacities for storing data, e.g., 2K, 4K, 8K, 16K, etc. A set of physical resources within the resource pool may be allocated to each network lookup function implemented in the network switch, and a combination of logical hash tables and/or logical-physical resource mappings may be used to allow lookup functions to access their allocated physical resources. The resources are dynamically allocable, such that the resources allocated for a particular lookup function may change, e.g., by adding un-allocated resources, or removing de-allocated resources, to or from the lookup function's corresponding logical hash table and logical-physical mapping. Accordingly, the network switch may support changes in resource demands of various lookup functions in various situations.

Upon receipt of a network packet, the network switch may run one or more of the lookup functions implemented in the network switch. Each lookup function may produce a lookup request that includes data used to identify to which hash table the lookup request should be provided. For example, a lookup request that includes a key may be provided to a logical table controller, which uses a hash function and a logical hash table that corresponds to the lookup function to identify the physical hash table(s) and the address at which the value that corresponds to the key may be found. The physical hash table address may be used to request response data from each physical storage location associated with the physical hash table address. The logical table controller, upon receipt of the response data, may provide the response data to the requesting lookup function. The results of the lookup request(s) for a particular network packet may be used to determine the manner in which the network packet is processed by the network switch. Other implementations, including implementations where hash functions are used within the lookup functions, may also be used to obtain data from dynamic hash table resources.

By way of example, a bridging lookup function may issue a lookup request to identify the egress switch port associated with the destination MAC address for a particular network packet received by a network switch. The destination MAC address may be used as a key for input into a hash function that provides a physical hash table address where the egress switch port may be found. A logical table controller may use other information included in the lookup request to identify the logical hash table that corresponds to the bridging lookup function. The logical hash table specifies one or more physical hash tables to which the logical hash table is mapped. The logical table controller may request, from each physical hash table mapped to by the logical hash table, response data stored at the physical hash table address. The egress switch port may be obtained from a physical hash table at the physical hash table address and provided to the bridging lookup function, which may then use the egress port to forward the particular network packet to the correct egress switch port. The configuration of dynamically allocated hash table resources, and the usage of devices that use dynamically allocated hash table resources, are described in further detail in the paragraphs that follow.

Referring now to the drawings, FIG. 1 is a block diagram of an example computing device 100 for using dynamically allocated hash table resources. Computing device 100 may be, for example, a network switch, network router, a wireless access point, an intrusion detection/protection device, a load balancer, a firewall, a server computer, a personal computer, or any other electronic device suitable for managing data stored in hash tables. In the implementation of FIG. 1, computing device 100 includes hardware processor 110 and machine-readable storage medium 120. In some implementations, the computing device 100 may be implemented in a programmable hardware device, e.g., using an Application Specific Integrated Circuit (ASIC) or Field-Programmable Gate Array (FPGA).

Hardware processor 110 may be one or more central processing units (CPUs), semiconductor-based microprocessors, and/or other hardware devices suitable for retrieval and execution of instructions stored in machine-readable storage medium 120. Hardware processor 110 may fetch, decode, and execute instructions, such as 122-128, to control the process for using dynamically allocated hash table resources. As an alternative or in addition to retrieving and executing instructions, hardware processor 110 may include one or more electronic circuits, such as an ASIC and/or FPGA, that include electronic components for performing the functionality of one or more of the instructions.

A machine-readable storage medium, such as 120, may be any electronic, magnetic, optical, or other physical storage device that contains or stores executable instructions. Thus, machine-readable storage medium 120 may be, for example, Random Access Memory (RAM), an Electrically Erasable Programmable Read-Only Memory (EEPROM), a storage device, an optical disc, and the like. In some implementations, storage medium 120 may be a non-transitory storage medium, where the term "non-transitory" does not encompass transitory propagating signals. As described in detail below, machine-readable storage medium 120 may be encoded with a series of executable instructions: 122-128, for using dynamically allocated hash table resources.

Each of the lookup functions 130 may perform lookups designed to determine how the computing device 100 should process data, such as a network packet received by the computing device 100. For example, a destination MAC address lookup function may be used to determine an egress switch port of a network packet. A QoS lookup function may be used to determine the QoS of the network packet, which may affect the priority, e.g. queuing, Class of Service (CoS), and/or Differentiated Services Code Point (DSCP) of the network packet. An Access Control List (ACL) lookup function may be used to determine whether the network packet is permitted by the security/access controls. A routing lookup function may be used to determine how the network packet will be routed, e.g., which output interface of the computing device 100 will be used to send the network packet to its destination.

In some implementations, physical hash table resources 140 are dynamically allocated to the lookup functions 130 by the computing device 100. The computing device 100 may, for example, determine the quantity of physical hash table resources 140 to be used by each of the lookup functions 130. The determination may be made based on information obtained from the lookup functions 130 and/or based on external information, e.g., provided by a system administrator or network controller. The computing device 100 may then generate a logical-physical mapping that specifies the physical hash table resources allocated to each lookup function. As described in further detail below, each physical hash table resource may also have a corresponding configuration mode selected by the computing device 100, the configuration mode specifying the manner in which physical hash tables return data in response to lookup requests.

As shown in FIG. 1, the computing device 100 executes instructions 122 to receive, from a particular lookup function of a plurality of lookup functions 130, a lookup request 132. The lookup request 132 may sent, for example, in response to a network packet being received by the computing device 100. In a situation where the computing device 100 implements a network switch, for example, the source of a network packet that triggers the lookup request may be an intermediary computing device that facilitates routing of the network packet to its destination, e.g. an adjacent router, an adjacent switch, or a client machine.

The computing device 100 executes instructions 124 to identify, based on the particular lookup function, a logical hash table that corresponds to the particular lookup function. The logical hash table maps to at least two physical hash table resources 140. While the physical hash table resources may be of the same capacity, in some implementations, at least two physical hash table resources 140 are of different capacities. For example, one physical hash table resource may have a 4 k capacity, or 4,096 entries, while a second physical hash table resource may have a capacity of 8 k, or 8,192 entries. In this example, the logical hash table would have a total capacity of 12 k, or 12,288 entries. A variety of physical hash table resources may be used for logical tables, e.g., multiple combinations of 4 k, 8 k, 16 k, 32 k, etc., physical hash tables may be combined for a single logical table. In addition, while the example in FIG. 1 uses at least two physical hash table resources, in some implementations a logical hash table may map to a single physical hash table resource.

The physical hash table resources 140 may be dynamically allocable to the lookup functions 130, e.g., by their association with the logical hash tables of the lookup functions 130. In some implementations, un-allocated resources may be disabled, e.g., to reduce power consumption. By way of example, each logical hash table may be represented by a string of bits, where the bits are used to identify which physical hash tables are used for the lookup function that corresponds to the logical hash table. For example, a logical hash table A may be represented by the string of bits "00010001," indicating two physical hash tables—one associated with a bit in the first position and another associated with a bit in the fifth position—are included in the logical hash table. A logical hash table B may be "11000100," indicating three physical hash tables—one associated with a bit in the third position, one associated with a bit in the seventh position, and one associated with a bit in the eighth position—are included in logical hash table B. A logical table C may be "00000010," indicating a single physical hash table included in logical hash table C. Un-allocated physical hash table resources, e.g., those associated with the fourth and sixth bit positions, may be un-used and powered down unless and until they are allocated to a lookup function.

The computing device 100 executes instructions 126 to obtain, from one of the physical hash table resources, response data that is responsive to the lookup request. In situations where a logical hash table maps to multiple physical hash table resources, the computing device may obtain response data from each of the physical hash tables mapped to by the logical hash table. In some implementations, the lookup request 132 includes a physical hash table address specifying the physical table location of the response data 142. In this situation, the computing device 100 may access the physical hash table resources mapped to by the logical hash table to obtain response data from RAM, for example. In some implementations, e.g., when using cuckoo hashing, a lookup request may include multiple physical hash table addresses.

In some implementations, the lookup request 132 includes a key, which the computing device 100 may provide to a hash function to obtain a physical hash table address where the response data 142 is stored. In some implementations, each of the lookup functions 130 has a corresponding hash function that is used to generate a physical hash table address. Each hash function used for each lookup function may be the same as or different from each other hash function used by the other lookup functions. As noted above, the physical hash table address may be calculated by the lookup functions 130 or, in some implementations, separately, such as by a separate logical table controller.

The manner in which the response data 142 is obtained may vary and may change depending on the manner in which the logical hash table and/or physical hash tables are implemented. In situations where a logical hash table maps to a single physical hash table, response data may be obtained from that single physical hash table. In some implementations, when multiple physical hash tables are mapped to by a single logical hash table response data may be obtained from each of the physical hash tables. In this situation, one of the responses may be selected, e.g., by the logical table controller, as the response provided to the lookup function. The manner in which one of multiple responses is selected may vary and may, for example, be determined based on logical positions of the physical hash tables within the logical hash tables, e.g., the response data from the physical hash table specified by the lowest positioned bit within the logical hash table string. The actual response data may vary, and may include the information to be used by the lookup function, such as a port number or device address, or may be a reference/pointer to data stored at a different location. In some implementations, the response data may include an indication of a match or no match, e.g., rather than, or in addition to, including the data stored within the corresponding physical hash table resource.

The manner in which physical hash tables are implemented may also vary. In some implementations, hash addresses may be split evenly between multiple physical hash tables in parallel. In this situation, each hash address goes to each hash table and response data is chosen from the results, e.g., using hit indications received from hash tables and a logical table controller to decide. In some implementations, a hash address may be divided evenly between two physical hash tables in series. Some bits of the address, e.g., bits 8:0, may go to each hash table, while bit 9 is used to select which physical hash table the lookup is sent to. In one example, a logical hash table with a capacity of 24 k may map to a first physical hash table resource with a capacity of 8 k and a second physical hash table resource with a capacity of 16 k. In this situation, the logical hash table may, in some implementations, map a first logical portion of the logical hash table to the first half of the 16 k resource, a second logical portion to the second half of the 16 k resource, and a third logical portion to the 8 k resource. The foregoing example creates three parallel hash tables, each of 8 k capacity, which may each be accessed by the same or separate hash functions, e.g., to handle hash table collisions.

The computing device 100 executes instructions 128 to provide the response data 142 to the particular lookup function. The response data 142 may be used for a variety of purposes. Using the destination MAC address lookup function example, the response data 142 may include an egress switch port of the computing device 100 through which a network packet may be forwarded. As noted above, the response data 142 may also indicate whether a match occurred and/or a reference to data stored at a separate location.

In some implementations, the computing device 100 may execute instructions to receive instructions to modify the logical hash table that corresponds to a lookup function. For example, in a situation where the computing device 100 is implemented in a Software Defined Networking (SDN) switch, a SDN controller may instruct the computing device 100 to assign more or less storage for a particular lookup function. Accordingly, the computing device 100 may modify the logical table for the lookup function by either allocating at least one additional physical hash table resource to the logical hash table or de-allocating at least one physical hash table resource from the logical hash table. Un-used physical resources may be deactivated or allocated to a different lookup function. Modifications to logical hash tables may also be performed in response to receiving instructions from, for example, a network administrator or management software executing on the computing device 100.

The example functionality described above with respect to FIG. 1 provides one of a variety of example network lookups and dynamic hash table resource configurations. A wide variety of hash functions and implementation details of the hash tables may be used. For example, cuckoo hashing to generate multiple hash addresses for each key may be used to perform parallel hash table lookups. Other example hash implementations may use, for example, linear probing or hopscotch hashing. Further implementations and examples are described in further detail in the paragraphs that follow.

Figure 2:
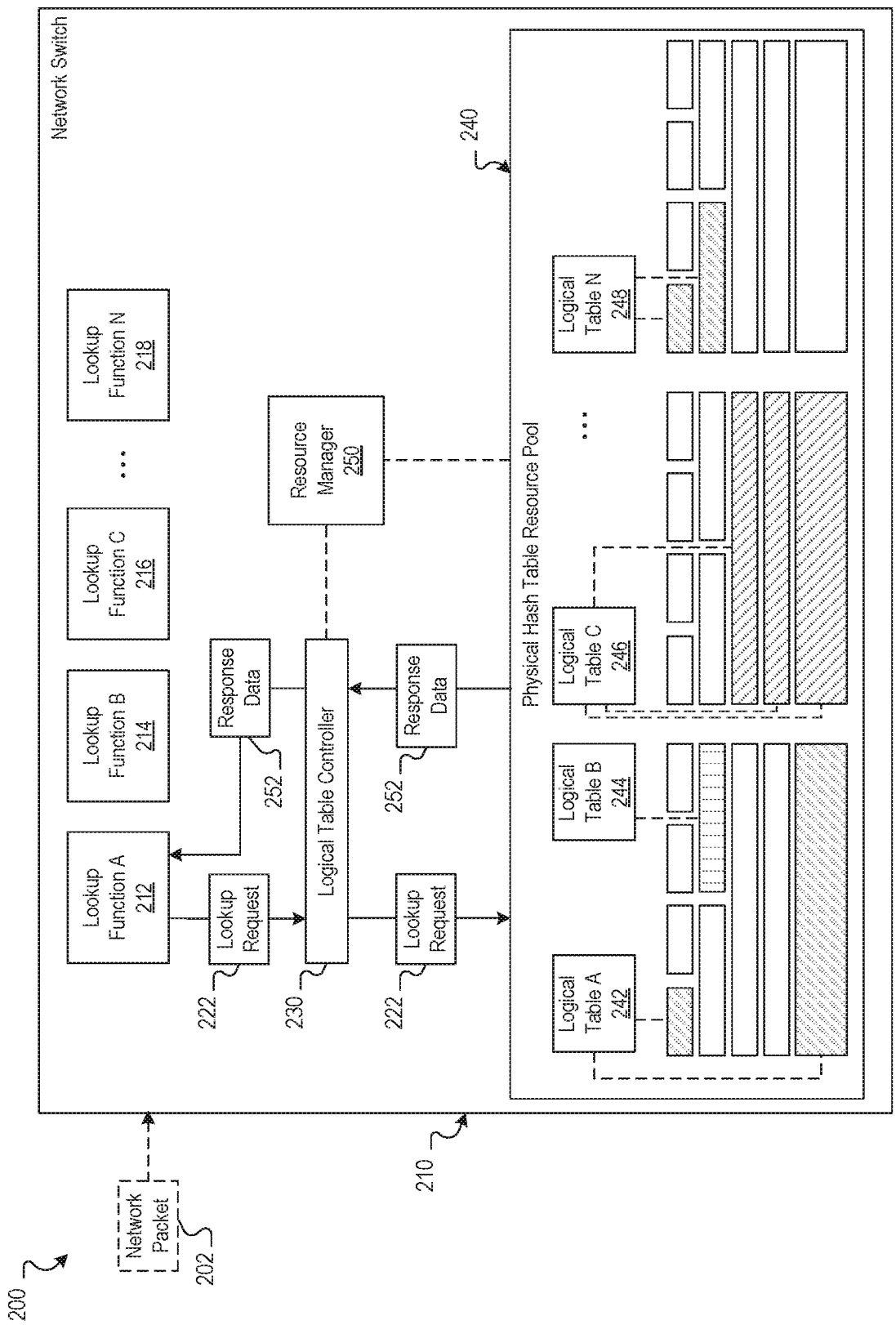
FIG. 2 is an example data flow for dynamic allocation of hash table resources within network devices.

FIG. 2 is an example data flow 200 for dynamic allocation of hash table resources within network devices. The data flow 200 depicts a network switch 210 processing a network packet 202. The network switch 210 may include programmable hardware, such as an ASIC or FPGA, configured to perform operations designed to dynamically allocate hash table resources within the network switch 210 and to perform operations designed to process the network packet 202 using the dynamically configured hash table resources. In some implementations, programmable hardware included in the network switch 210 may be configured to perform the operations described with respect to the hardware processor of FIG. 1.

The network switch 210 includes lookup functions, e.g., lookup function A 212, lookup function B 214, lookup function C 216, and lookup function N 218. Each lookup function may be designed to produce lookup requests for data associated with particular network packets and, in some implementations, take action or cause the network switch 210 to take action based upon responses to the lookup requests. The data used by the lookup functions may vary and may include data included in network packets and/or data related to the network packets, e.g., MAC addresses, IP addresses, protocol information, network switch 210 ingress port, etc. For example, a lookup function A 212 may issue lookup requests for performing layer 2 bridging, e.g., to look up a destination MAC address and determine an output port of the network switch 210 to which the network packet 202 is sent. Lookup function B 214 may be designed to issue lookup requests to look up a destination IP address, e.g., to determine an egress interface to which the network packet 202 will be routed. Lookup function C 216 may be designed to issue lookup requests for performing access controls on network packets, e.g., source and destination address lookups for ACL security.

The resource manager 250 included in the network switch 210 is designed to configure dynamic hash table resources, such as those depicted in the physical hash table resource pool 240. The logical table controller 230 is responsible for directing lookup requests received from lookup functions to the appropriate physical hash table resource(s), e.g., the physical resources to which a logical hash table of the lookup function is mapped. The logical table controller 230 may direct lookup requests to the correct physical hash table resources in a variety of ways. For example, the logical table controller 230 may implement logical hash tables for each of the lookup functions, each logical hash table mapping to one or more physical hash table resources. The lookup requests may include one or more physical hash table addresses and data used to identify a logical hash table that specifies the physical hash table(s) from which response data is retrieved.

The logical table controller 230 is also responsible for forwarding response data received from the physical hash table resources to the requesting lookup function. As with the handling of the lookup requests, this may be performed in a variety of ways. For example, the logical table controller 230 may include a mapping of resources to lookup functions, or a tag/identifier included in both the lookup request and the response data may be used to identify the lookup function to which response data should be provided. The logical table controller 230 itself may also be implemented in a variety of ways, and may be implemented in hardware, software, or a combination thereof. For example, the logical table controller 230 may include one programmable crossbar for handling incoming lookup requests and another programmable crossbar for handling response data received from the hash table resources.

The example physical hash table resource pool 240 includes various blocks to represent resources, e.g., RAM, which are dynamically allocable to lookup functions. Patterned blocks are used to indicate which physical resources are allocated to a lookup function, and dotted lines between patterned blocks and logical table blocks indicate which logical table each physical resource is assigned. The size of the example physical resource blocks provides an indication of the capacity, e.g., the blocks may range from 4K for the smallest to 32K for the largest. Logical table A 242 maps to two blocks, one of 4K and one of 32K, for a total capacity of 36K. Logical table B 244 maps to one 16K block for a total capacity of 16K. Logical table C maps to three blocks, two of 16K and one of 32K, for a total capacity of 64K. Logical table N maps to two blocks, one of 4K and one of 8K, for a total capacity of 12K. While the logical table blocks are depicted in the physical hash table resource pool 240 box, the logical tables may be stored at the logical table controller 230 and/or resource manager 250.

The resource manager 250 may determine the quantity of physical resources to be assigned to the various lookup functions, e.g., using specifications of the lookup functions, administrator input, and/or management software executing on the network switch 210. The resource manager 250 may also manage the dynamic allocation, and de-allocation, of physical resources as the needs of the lookup functions and/or network switch 210 change. Each logical-physical mapping may be modified, e.g., upon receiving an indication that resource needs for a lookup function have changed. For example, if the network switch 210 is re-deployed in a different network environment, the lookup functions used and the amount of resources needed by the lookup functions may change, and the resource manager 250 may update tables that include the logical-physical mappings accordingly, e.g., to allocate and/or de-allocate physical hash table resources within the pools, as appropriate.

The data flow 200 also depicts operation of the network switch 210, including the use of the dynamically allocated hash table resources. Upon receipt of the network packet 202, lookup function A 212 issues a lookup request 222, which is provided to the logical table controller 230. The logical table controller 230 identifies, e.g., based on a logical table that maps lookup functions to logical hash tables, logical table A 242 having the physical hash table resources allocated for lookup function A 212. The logical hash table may include, for example, a bit map to indicate which physical hash tables are part of logical table A, e.g., logical table A=00010001 indicates two of eight physical hash tables are allocated to the logical table. Using this example, the size of the bit map may vary. e.g., depending upon the number of physical hash table resources. Other forms of mapping may also be used to implement the logical to physical hash table mapping.

Data included in the lookup request 222 is used to determine a physical hash table address at which data responsive to the lookup request 222 is stored. As noted above, the manner in which the physical hash table address is obtained may vary. In some implementations, the lookup function A calculates a physical hash address using a hash function. In some implementations, the logical table controller 230 hashes data included in the lookup request 222 to identify a physical hash table address which may, for example, be included in one of the physical hash tables mapped to by logical table A 242.

The lookup request 222 is forwarded by the logical table controller 230 to the physical hash table resource pool 240. The lookup request 222 is processed at the physical hash table resource pool 240 and response data 252 is obtained from at least one of the physical hash table resources mapped to by logical table A 242. As indicated above, in some implementations response data 252 is obtained from each physical hash table resource included in a logical table. For example, response data 252 may be obtained from both physical hash table resources that are mapped to by logical table A 242. In implementations where physical hash addresses are divided between physical hash tables in series, response data 252 may only be obtained from one of the physical hash table resources.

The response data 252 is sent back to the logical table controller 230, which identifies, e.g., based on a lookup function mapping or a tag/flag included in the response data 252, that the response data 252 should be provided to lookup function A 212. In situations where multiple responses are received from the physical hash table resources, the logical table controller 230 may determine which response data 252 to use, e.g., prioritizing based on match indications and/or bit positions of the physical hash tables that provided response data 252. After the response data 252 is provided to lookup function A 212, the lookup function may, for example, use the response data to determine how to process the network packet 202. In some implementations, the response data may include an indication of a match or no match, e.g., instead of or in addition to including the data stored within the corresponding physical hash table resource.

While the example data flow 200 depicts programmable hardware performing the functions described above within a programmable network switch, other implementations may also make use of dynamically allocated hash table resources. For example, routers, wireless access points, intrusion detection and/or protection devices, load balancers, firewalls, server computers, and virtual switches and routers, may all implement the processes for dynamic allocation of hash table resources and/or the use of those resources.

Figure 3:
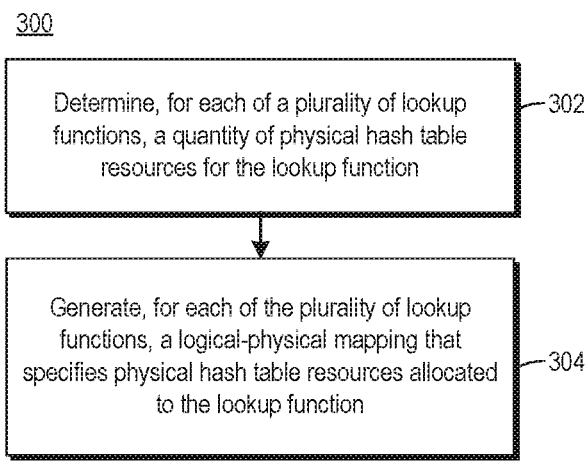
FIG. 3 is a flowchart of an example method for generating a logical physical mapping for hash table resources.

FIG. 3 is a flowchart of an example method 300 for generating a logical-physical mapping for hash table resources. The method 300 may be performed by a computing device, such as a computing device described in FIG. 1. Other computing devices may also be used to execute method 300. Method 300 may be implemented in the form of executable instructions stored on a machine-readable storage medium, such as the storage medium 120, and/or in the form of electronic circuitry, such as an ASIC.

For each of a plurality of lookup functions, a quantity of physical hash table resources for the lookup function is determined (302). The quantity of physical hash table resources to be used by each lookup function may vary, and may be determined in a variety of ways. For example, a configuration specification for computing devices or lookup functions may indicate an amount of resources for each lookup function, lookup functions may specify a quantity, and/or a separate controller device—such as an SDN controller—may provide a device implementing the lookup functions with the quantities. The device implementing the lookup functions may, in some implementations, include logic for using a default quantity of hash table resources for lookup functions and/or logic for adjusting the quantity allocated to each lookup function over time.

For each of the plurality of lookup functions, a logical-physical mapping that specifies physical hash table resources allocated to the lookup function is generated (304). In some implementations, the logical-physical mapping specifies, for one of the lookup functions, physical hash table resources of different capacities. In some implementations, one or more bits of the logical hash table may be used to specify which physical hash table resource the logical hash table maps to. For example, each physical hash table may be able to match on a specific value of upper bits of an incoming physical hash address. This allows multiple hash tables to work in parallel or as a contiguous power of two hash table. As noted above, a logical hash table may include a variety of combinations of physical hash table resources of varying capacities.

In some implementations, instructions are received to modify a particular logical hash table that corresponds to a particular lookup function. In this situation, the particular logical hash table may be modified by, for example, allocating at least one additional physical hash table resource to the logical hash table or de-allocating at least one physical hash table resource from the logical hash table. By way of example, if a routing lookup function begins with a 16K logical hash table and later needs an additional 12K, additional physical hash table resources may be assigned to the routing lookup function and mapped to by the logical hash table, e.g., a 4K and 8K physical hash table resource may be added to the existing 16K, or a single 12K physical hash table resource may be added. In some implementations, when physical hash table resources are allocated or de-allocated, the existing values within the physical hash tables may be re-hashed to determine new addresses for storing the existing data. In implementations where physical hash tables are implemented in parallel, no re-hashing is needed to add a new physical hash table resource. Instructions to modify logical hash tables may be provided, for example, by programmable logic implemented within a computing device, by a lookup function logic, and/or by a separate controller device, such as an SDN controller in the SDN networking context.

Figure 4:
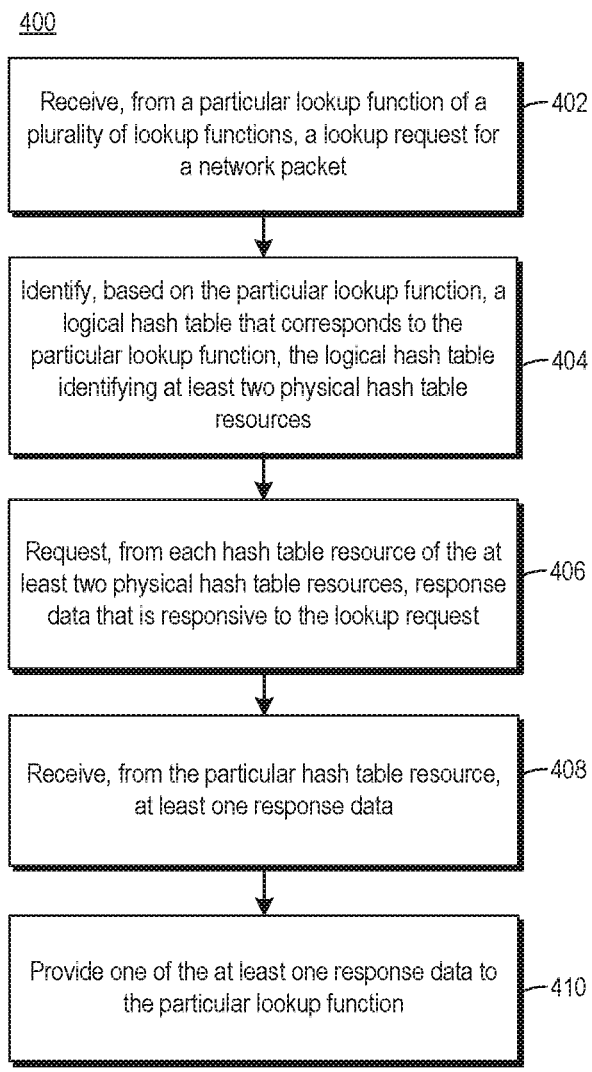
FIG. 4 is a flowchart of an example method for using dynamically allocated hash table resources.

FIG. 4 is a flowchart of an example method 400 for using dynamically allocated hash table resources. The method 400 may be performed by a computing device, such as a computing device described in FIG. 1. Other computing devices may also be used to execute method 400. Method 400 may be implemented in the form of executable instructions stored on a machine-readable storage medium, such as the storage medium 120, and/or in the form of electronic circuitry, such as an ASIC.

A lookup request for a particular network packet is received from a particular lookup function of a plurality of lookup functions (402). For example, an egress port address lookup function within a network switch may perform a lookup on a destination MAC address specified by a network packet to identify an egress port of the network switch through which the network packet should be forwarded. In this example, the lookup request may include the destination MAC address.

Based on the particular lookup function, a logical hash table that corresponds to the particular lookup function is identified, the logical hash table identifying at least two physical hash table resources (404). For example, the egress port lookup function may correspond to an egress port logical table that has a capacity of 48K, the logical hash table may map to two different physical hash table resources, one 32K in capacity, the other 16K in capacity. In some implementations, each physical hash table resource is dynamically assignable to each logical hash table of each of the lookup functions. For example, the 32K and/or 16K resources used by the egress port lookup function may be re-assigned to a different lookup function. As another example, an additional physical resource of any storage capacity may be allocated to the egress port lookup function, increasing the total capacity of the logical hash table associated with the egress port lookup function. These changes may be made in response to a variety of things, such as lookup function requirements and/or third party device instructions. The dynamic assignments may be made, for example, by a programmable processor modifying the physical resources specified within the logical tables and/or logical-physical mappings for various lookup functions.

Response data that is responsive to the lookup request is requested from each hash table resource of the at least two physical hash table resources (406). In some implementations, lookup functions hash data to obtain a logical hash address for the logical hash table that corresponds to the lookup function, and the logical hash address is used by a logical table controller or physical hash table resource controller to identify a physical hash table and address at which the data responsive to the lookup request is stored. For example, the egress port lookup function may hash the destination MAC address to obtain a physical hash table address, and the physical hash table address may be included in the lookup request. A logical table controller may use a logical-physical mapping to identify the physical hash table resource(s) at which the response data is stored. Upon identifying the physical hash table resource(s), a request for the response data may be provided to the physical hash table resource controller.

In some implementations, a logical table controller or physical hash table resource controller may hash data included in the lookup request, such as the destination MAC address, to obtain a physical hash table address. In implementations where each lookup function has a corresponding hash function used to identify a hash table address, the hash function that corresponds to the particular lookup function may be the same as or different from at least one other hash function that corresponds to another lookup function.

The response data is received from the particular hash table resource (408). For example, a physical hash table resource controller may obtain the response data from physical resource, such as RAM, and provide the response data to the logical table controller or back to the requesting lookup function.

One of the response data is provided to the particular lookup function (410). In situations where multiple response data are provided, the logical table controller may choose one of the response data to provide to the particular lookup function. The logical table controller may provide response data to the particular lookup function in a variety of ways, e.g., tracking lookup requests using an identifier or using information included in the response data. The particular lookup function may perform a variety of actions upon receipt of the response data. For example, the egress port lookup function may use the response data to determine which egress port a network packet should be forwarded to.

The foregoing disclosure describes a number of example implementations for dynamic allocation of hash table resources. As detailed above, examples provide a mechanism for dynamically allocating physical hash table resources to one or more functions, and potential applications of a system that is capable of dynamically allocating hash table resources in such a manner.

We claim:

1. A computing device for dynamic management of hash table resources, the computing device comprising a programmable hardware processor configured to:
   apply a plurality of lookup functions on a piece of data, wherein a respective lookup function is associated with a distinct operation that is allowed be performed on the piece of data;
   receive, from a particular lookup function of the plurality of lookup functions, a lookup request comprising key data associated with the piece of data;
   obtain a hash address by hashing the key data using a hash function that corresponds to the lookup function;
   identify, based on the particular lookup function, a primary hash table that corresponds to the particular lookup function, wherein the primary hash table maps to at least two secondary hash tables, wherein a capacity of the primary hash table is based on a sum of respective capacities of the at least two secondary hash tables;
   obtain, from one of the at least two secondary hash tables, response data that is responsive to the lookup request received from the particular lookup function based on the hash address; and
   provide the response data to the particular lookup function as a response to the lookup request.

2. The computing device of claim 1, wherein:
   the lookup request includes the hash address.

3. The computing device of claim 1, wherein:
   the at least two secondary hash tables include:
   a first hash table of a first capacity, and
   a second hash table of a second capacity distinct from the first capacity;
   wherein the first and second capacities are dynamically assignable to first and second hash tables, respectively.

4. The computing device of claim 1, wherein the programmable processor is further configured to:
   obtain respective pieces of response data from the at least two of the secondary hash tables, and
   select one of the pieces of response data to provide to the particular lookup function as the response to the lookup request.

5. The computing device of claim 1, wherein a respective secondary hash table is associated with a configuration mode specifying how a piece of data is obtained from the secondary hash table as a response to a corresponding lookup request.

6. The computing device of claim 1, wherein the programmable processor is further configured to:
   receive instructions to modify the primary hash table associated with the particular lookup function; and
   modify the primary hash table by:
   allocating at least one additional secondary hash table to the primary hash table; or
   de-allocating at least one secondary hash table from the primary hash table.

7. A method for dynamic management of hash table resources, implemented by a hardware processor, the method comprising:
   applying a plurality of lookup functions on a piece of data, wherein a respective lookup function is associated with a distinct operation that is allowed be performed on the piece of data;
   receiving, from a particular lookup function of the plurality of lookup functions, a lookup request comprising key data associated with the piece of data;
   obtaining a hash address by hashing the key data using a hash function that corresponds to the lookup function;
   identifying, based on the particular lookup function, a primary hash table that corresponds to the particular lookup function, wherein the primary hash table maps to at least two secondary hash tables, wherein a capacity of the primary hash table is based on a sum of respective capacities of the at least two secondary hash tables;
   obtaining, from one of the at least two secondary hash table tables, response data that is responsive to the lookup request received from the particular lookup function based on the hash address; and
   providing the response data to the particular lookup function as a response to the lookup request.

8. The method of claim 7, further comprising:
   receiving instructions to modify the primary hash table associated with the particular lookup function; and
   modifying the primary hash table by:
   allocating at least one additional second hash table to the primary hash table; or
   de-allocating at least one secondary hash table from the primary hash table.

9. The method of claim 7, wherein:
   the two secondary hash tables include:
   a first hash table of a first capacity, and
   a second hash table of a second capacity distinct from the first capacity;
   wherein the first and second capacities are dynamically assignable to first and second hash tables, respectively.

10. The method of claim 7, wherein the lookup request includes the hash address.

11. The method of claim 7, wherein the method further comprises:
    obtaining respective pieces of response data from the at least two of the secondary hash tables, and
    selecting one of the pieces of response data to provide to the particular lookup function as the response to the lookup request.

12. The method of claim 7, wherein a respective secondary hash table is associated with a configuration mode specifying how a piece of data is obtained from the secondary hash table as a response to a corresponding lookup request.

13. The method of claim 7, further comprising:
obtaining respective pieces of response data from the at least two of the secondary hash tables, and
selecting one of the pieces of response data to provide to the particular lookup function as the response to the lookup request.

14. A non-transitory machine-readable storage medium encoded with instructions executable by a hardware processor of a computing device for dynamic management of hash table resources, the machine-readable storage medium comprising instructions to cause the hardware processor to:
apply a plurality of lookup functions on a piece of data, wherein a respective lookup function is associated with a distinct operation that is allowed be performed on the piece of data;
receive, from a particular lookup function of the plurality of lookup functions, a lookup request comprising key data associated with the piece of data;
obtain a hash address by hashing the key data using a hash function that corresponds to the lookup function;
identify, based on the particular lookup function, a primary hash table that corresponds to the particular lookup function, wherein the primary hash table maps to at least two secondary hash tables, wherein a capacity of the primary hash table is based on a sum of respective capacities of the at least two secondary hash tables;
obtain, from one of the at least two secondary hash tables, response data that is responsive to the lookup request received from the particular lookup function based on the hash address; and
provide one of the at least one response data to the particular lookup function as a response to the lookup request.

15. The non-transitory machine-readable storage medium of claim 14, wherein a respective secondary hash table is associated with a configuration mode specifying how a piece of data is obtained from the secondary hash table as a response to a corresponding lookup request.

16. The non-transitory machine-readable storage medium of claim 14, wherein:
the at least two secondary hash tables include:
a first hash table of a first capacity, and
a second hash table of a second capacity distinct from the first capacity;
wherein the first and second capacities are dynamically assignable to first and second hash tables, respectively.

17. The non-transitory machine-readable storage medium of claim 14, wherein the machine-readable storage medium further comprises instructions to cause the hardware processor to:
obtain respective pieces of response data from the at least two of the secondary hash tables, and
select one of the pieces of response data to provide to the particular lookup function as the response to the lookup request.

18. The non-transitory machine-readable storage medium of claim 14, wherein the machine-readable storage medium further comprises instructions to cause the hardware processor to:
receive instructions to modify the primary hash table associated with the particular lookup function; and
modify the primary hash table by:
allocating at least one additional second hash table to the primary hash table; or
de-allocating at least one secondary hash table from the primary hash table.

\* \* \* \* \*